United States Patent [19]
Zagrodnik

[11] Patent Number: 5,725,138
[45] Date of Patent: Mar. 10, 1998

[54] MOTORCYCLE LUGGAGE RACK AND BACKREST ASSEMBLY

[75] Inventor: Phillip J. Zagrodnik, Hartland, Wis.

[73] Assignee: Harley-Davidson Motor Company, Milwaukee, Wis.

[21] Appl. No.: 686,752

[22] Filed: Jul. 26, 1996

[51] Int. Cl.⁶ .................................................. B62J 1/28
[52] U.S. Cl. .......................... 224/413; 224/415; 224/418
[58] Field of Search ..................................... 224/418, 415, 224/413

[56] References Cited

U.S. PATENT DOCUMENTS 4,266,703  5/1981  Litz .................................. 224/418 X
4,269,335  5/1981  LaRose et al. .................... 224/418 X
4,466,660  8/1984  Mabie ............................... 224/415 X

OTHER PUBLICATIONS

Harley-Davidson, 1995 Harley-Davidson Genuine Parts & Accessories, p. 63.
J. C. Whitney & Co. catalog, p. 243, 1989.

*Primary Examiner*—Renee S. Luebke
*Attorney, Agent, or Firm*—Michael, Best & Friedrich LLP

[57] ABSTRACT

A luggage rack and backrest assembly mountable to a motorcycle. The assembly includes a luggage rack portion and a backrest. The backrest is both removably secured to the luggage rack portion and adjustable relative to the luggage rack portion.

17 Claims, 5 Drawing Sheets

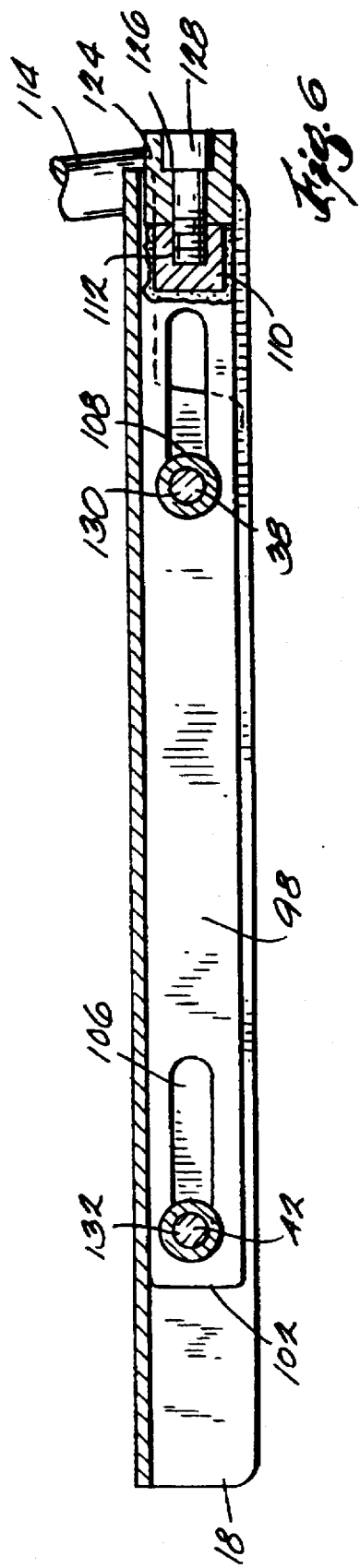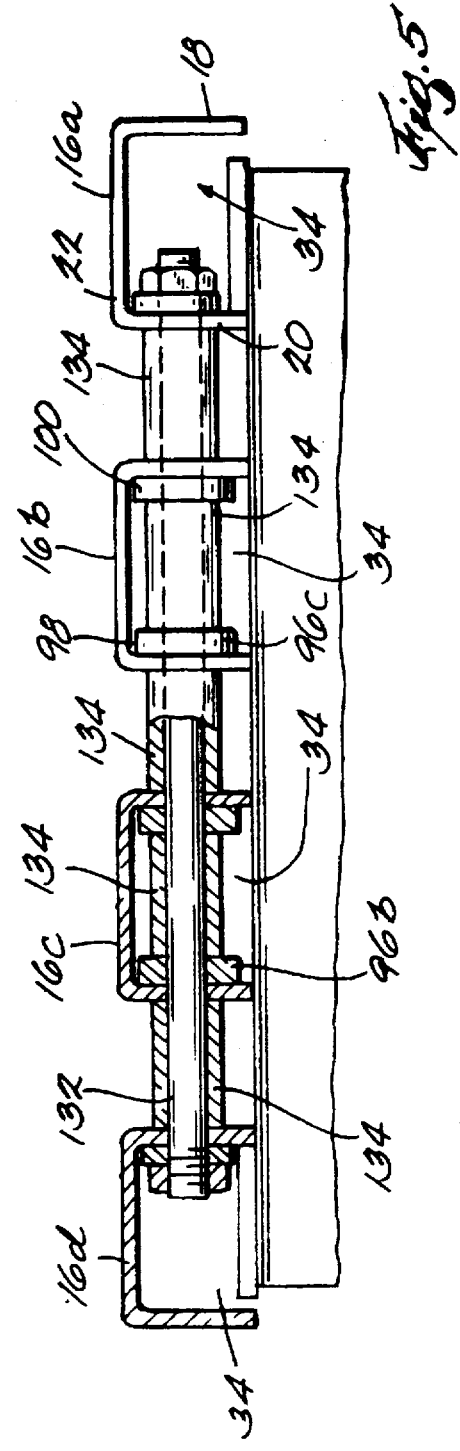

MOTORCYCLE LUGGAGE RACK AND BACKREST ASSEMBLY

FIELD OF THE INVENTION

The invention relates to the field of motorcycle accessories, and more particularly to motorcycle luggage rack and backrest assemblies.

BACKGROUND OF THE INVENTION

Luggage carriers are commonly secured on the backs of motorcycles to transport objects such as suitcases, camping gear or tools. Luggage carriers commonly take the form of luggage racks having a support surface for carrying objects. Luggage racks are typically mounted on the back of a motorcycle.

Often it is desirable to the motorcycle rider to combine a luggage rack with a backrest into one unit. Backrests, commonly called sissy bars, are typically mounted onto a motorcycle behind the motorcycle rider or passenger seat. The backrest supports the motorcycle rider or passenger while in the seated position and makes riding on the motorcycle more comfortable. Some backrests are adjustable to accommodate different sized riders and passengers.

SUMMARY OF THE INVENTION

The invention provides a luggage rack and backrest assembly including a luggage rack portion, an adjustment member movably (e.g., slidably) connected to the luggage rack portion, and a backrest detachably connected (e.g., using fasteners, such as bolts) to the adjustment member. The assembly can further include a securing device for securing a position of the adjustment member relative to the luggage rack portion. For example, the securing device can include a transverse rod (e.g., a threaded rod) positioned through a slot in the adjustment member.

The present invention is also embodied in a method of using a luggage rack and backrest assembly having a luggage rack portion, an adjustment member connected to the luggage rack portion, and a backrest connected to the adjustment member. The method includes the steps of moving (e.g., sliding) the backrest and the adjustment member relative to the luggage rack portion, securing the adjustment member in place relative to the luggage rack portion, and detaching the backrest from the adjustment member. In order to facilitate the moving step, the method can further include the step of loosening the connection between the adjustment member and the luggage rack portion. Preferably, the backrest is connected to the adjustment member by fasteners, and the detaching step includes the step of loosening the fasteners.

BRIEF DESCRIPTION OF THE DRAWINGS

FIG. 5 is a section view taken along line 5—5 of FIG. 4.

FIG. 6 is a section view taken along line 6—6 of FIG. 4.

Figure 1:
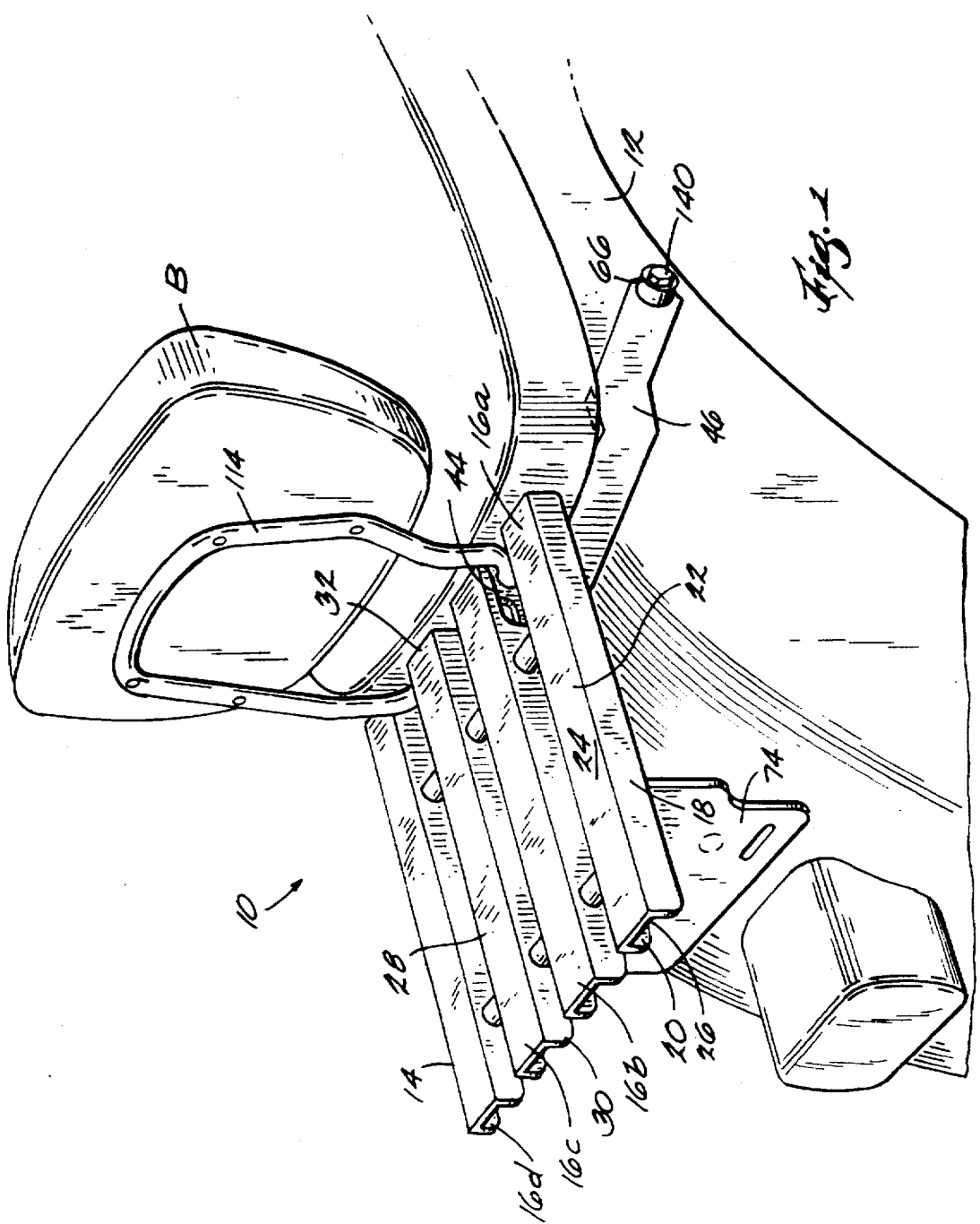
FIG. 1 is a perspective view of a luggage rack and backrest assembly embodying the invention mounted onto the rear of a motorcycle.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Referring now to the drawings, there is shown in FIG. 1 a luggage rack and backrest assembly 10 embodying the invention. The assembly 10 is mounted onto a motorcycle 12.

The assembly 10 includes a luggage rack portion 14 comprised of four spaced, parallel rack members 16a, 16b, 16c and 16d. Each rack member 16 is generally U-shaped in cross-section having a leg 18, a leg 20 and a web 22 therebetween. Each web 22 has an outer face 24 and an inner face 26. The four rack members 16 are oriented such that the outer faces 24 of the webs 22 of the members 16 are planar and define a support surface 28 on which the objects to be transported are supported. The support surface 28 has a first end edge 30 and a second end edge 32. The legs 18 and 20 and web 22 of each member 16 defines a channel 34 (FIG. 5).

Figure 2:
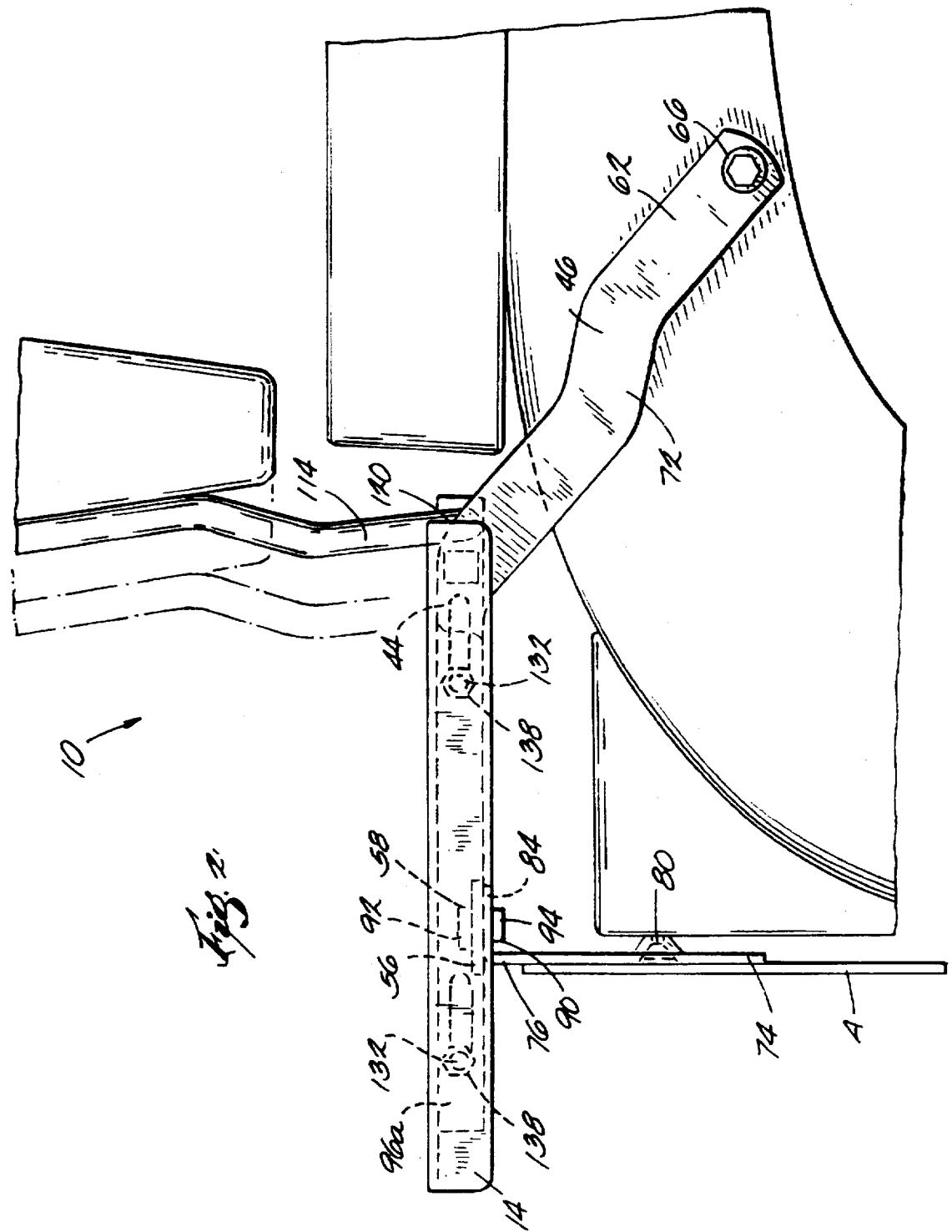
FIG. 2 is a side view of the luggage rack and backrest assembly of FIG. 1.
Figure 4:
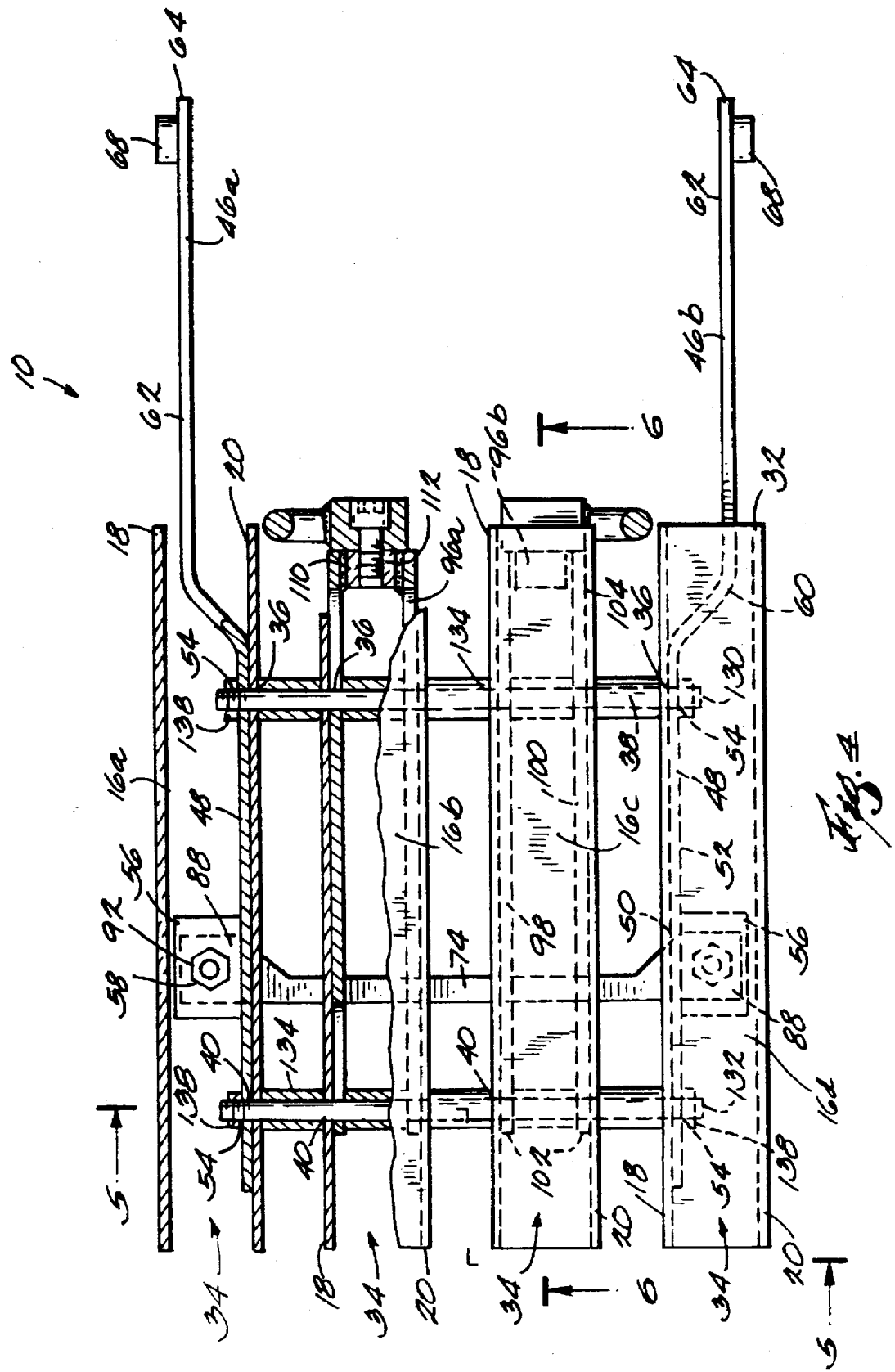
FIG. 4 is a bottom view of the luggage rack and backrest assembly of FIG. 1.

Referring now to FIG. 4, through the leg 20 of member 16a, the legs 18 and 20 of members 16b and 16c and the leg 18 of member 16d are apertures 36 that are axially aligned. The aligned apertures 36 define a first passageway 38. Similarly, through the leg 20 of member 16a, the legs 18 and 20 of members 16b and 16c and the leg 18 of member 16d are apertures 40 that are axially aligned. The aligned apertures 40 define a second passageway 42. As best shown in FIGS. 1 and 2, the leg 18 of member 16b and the leg 20 of member 16c include relieved areas 44 adjacent the second end edge 32 of the support surface 28.

As best shown in FIGS. 2 and 4, the assembly 10 further includes a pair of supports 46. Each support 46 includes a first portion 48 that is generally rectangular and has an inner surface 50 and an outer surface 52. The first portion 48 has therein two apertures 54. A mounting plate 56 extends outwardly from the outer surface 52 of the first portion 48 of each of the supports 46 at an angle of approximately 90 degrees. The mounting plate 56 is generally rectangular and is fixedly secured to the first portion 48 of each support 46 such as by welding or the like. The mounting plate 56 has therethrough an aperture 58.

An intermediate portion 60 of each support 46 extends outwardly and at an angle relative to the first portion 48. A second portion 62 extends from the intermediate portion 60. The second portion 62 terminates in an end 64 having therein an aperture 66. A boss 68 extends outwardly from the periphery of the aperture 66 and has itself therethrough an aperture that is aligned with the aperture 66. The second portion 62 includes a central curve 72 (FIG. 2). As shown in FIG. 4, the first portion 48 and the second portion 62 of each support 46 are generally parallel.

Figure 3:
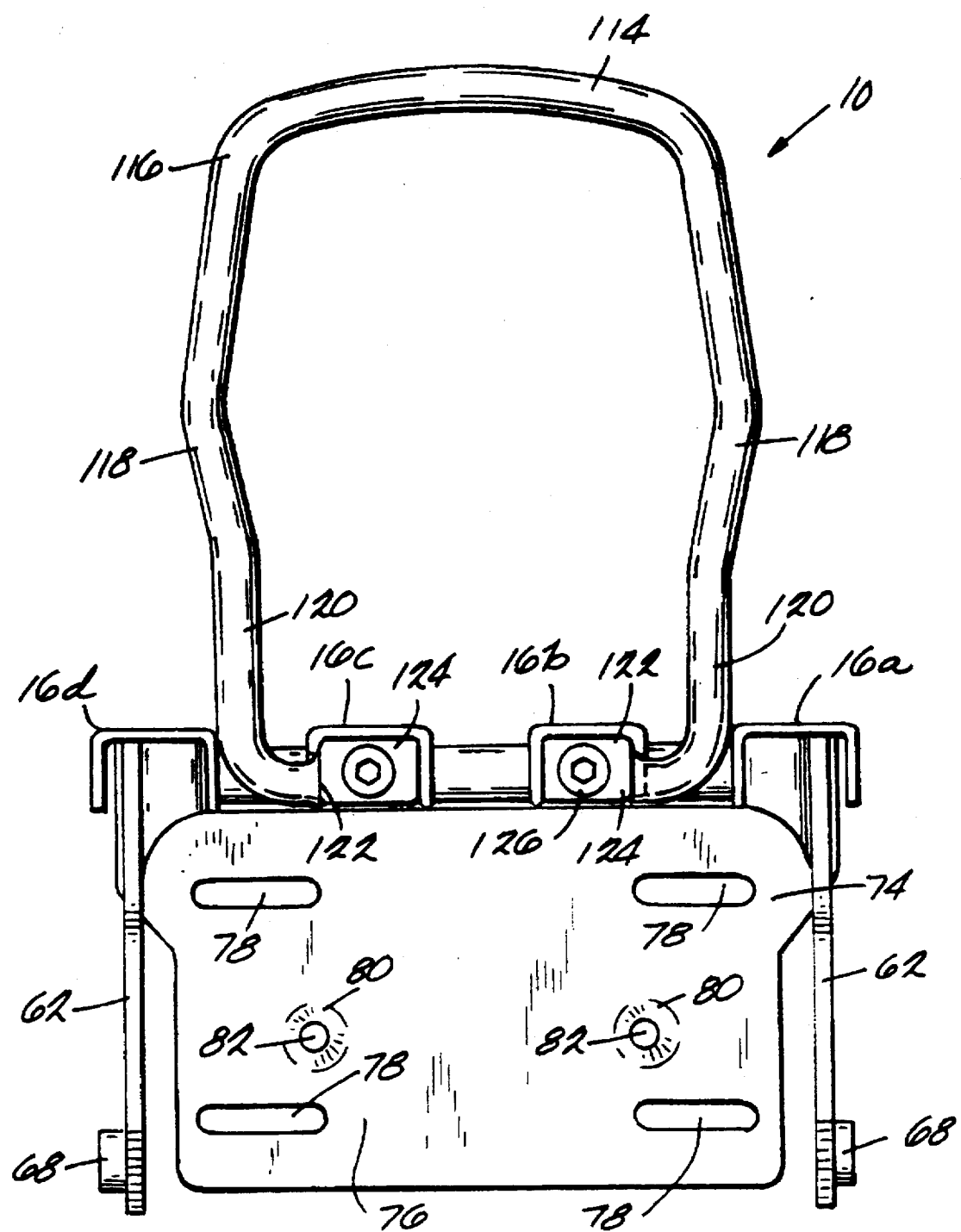
FIG. 3 is a front view of the luggage rack and backrest assembly of FIG. 1.

Referring now to FIGS. 2 and 3, the assembly 10 further includes a license plate bracket 74. The bracket 74 includes a plate 76 that is generally rectangular. The plate 76 includes a plurality of openings such as the four slots 78. The slots 78 facilitate the mounting of a license plate A to the bracket 74 (FIG. 2). The plate 76 further includes a pair of cone-shaped bosses 80 each of which depends from the plate 76 and terminates in a central aperture 82. A flange 84 extends outwardly from one end of the plate 76 at an angle of approximately 90 degrees from the plate 76. As best shown in FIGS. 2 and 4, the flange 84 includes two enlarged end portions 88. Each end portion 88 has therethrough an aperture 90. The bracket 74 is secured to the supports 46 by aligning the apertures 90 on the enlarged end portions 88 of the flange 84 with the respective apertures 58 on the mounting plates 56. A suitable fastener such as a bolt 92 is threaded into the aligned apertures 90 and 58 and secured in place such as with a nut 94.

Turning to FIGS. 4 through 6, the assembly 10 further includes a pair of sliding members 96a and 96b. Each sliding member 96a, 96b includes a pair of spaced parallel walls 98 and 100 that are both generally rectangular. Each wall 98 and 100 has a first end 102 and a second end 104. Adjacent the first ends 102 of both walls 98 and 100 are first elongate elliptical slots 106 that are elongate in the direction of the length of the walls 98 and 100 (FIG. 6). Likewise, adjacent the second ends 104 of both walls 98 and 100 are second elongate elliptical slots 108 that are elongate in the direction of the length of the walls 98 and 100. A wall 110 extends between the second ends 104 of the walls 98 and 100. The wall 110 includes a threaded bore 112. Preferably, the wall 110 is a cylindrical member that is fixedly secured between the walls 98 and 100 such as by welding.

Referring now to FIGS. 1 through 3, the assembly 10 further includes a backrest 114. The backrest 114 is preferably a metal rod shaped into a predetermined configuration. Preferably, the backrest 114 is shaped into the configuration as shown in FIG. 3. However, it should be noted that the backrest 114 can be shaped into any configuration to provide support to the back of the rider or passenger. The configuration of the backrest 114 as shown in FIG. 3 includes an upper U-shaped portion 116. A cushion or pad can be secured to the backrest 114 at the upper portion 116 for increased rider or passenger comfort (FIG. 1). The backrest 114 further includes a pair of intermediate narrowing portions 118 and a pair of generally L-shaped portion 120 depending from the intermediate portions 118. Each L-shaped portion 120 terminates in an end 122. A mounting block 124 is secured to each end 122 such as by welding. Each mounting block 124 has therethrough a threaded bore 126 with an axis that is transverse to the direction of extension of the backrest 114.

As best shown in FIG. 6, the backrest 114 is removably securable to the sliding members 96 as follows. The bore 126 of each mounting block 124 is aligned with the bore 112 of the wall 110 of the sliding members 96, such that the mounting blocks 124 and the respective walls 110 abut. A fastener such as a hex screw 128 is positioned in the aligned bores 126 and 112 and removably secures the backrest 114 to the sliding members 96. The backrest 114 is thus removable from the luggage rack portion 14 through removal of the hex screw 128 from the aligned bores 126 and 112.

Turning now to FIGS. 4 and 5, one of the sliding members 96a is housed and slides in the channel 34 of rack member 16b and the other of the sliding members 96b is housed and slides in the channel 34 of the rack member 16c. The sliding members 96 are oriented such that the wall 98 is adjacent the leg 18 of a respective rack member 16b or 16c, the wall 100 is adjacent the leg 20 of a respective rack member 16b or 16c, and the wall 110 is adjacent the second end edge 32 of the support surface 28. The sliding members 96 are further oriented such that the slots 108 are aligned with the first passageway 38 and the slots 106 are aligned with the second passageway 42.

As best shown in FIG. 4, the supports 46 are secured to the rack members 16a and 16d and the sliding members 96 are slidably housed within a channel 34 through the use of a first rod 130, a second rod 132 and a plurality of tube spacers 134. Specifically, one support 46a is oriented adjacent the leg 20 of rack member 16a and the other support 46b is oriented adjacent the leg 18 of rack member 16d. The supports 46 are oriented such that the apertures 54 are axially aligned with a respective passageway 38 or 42. Tube spacers 134 are positioned along the first passageway 38 between the rack member 16a and the rack member 16b, between the walls 98 and 100 of the sliding member 96a, between the rack member 16b and the rack member 16c, between the walls 98 and 100 of the sliding member 96b and between the rack member 16c and the rack member 16d. The spacers 134 are appropriately dimensioned in length so as to either fit between the walls 98 and 100 of the sliding members 96a and 96b or so as to space adjacent rack members 16 a predetermined distance. The first rod 130 is positioned in the first passageway 38 and specifically is positioned in the apertures 54 in the supports 46, in the apertures 36 in the legs 18 and 20 of the rack members 16, in the slots 108 of sliding members 96 and through the spacers 134. The first rod 130 includes a pair of threaded ends that terminate in the channels 34 of the rack members 16a and 16d. Fasteners 138 such as washers and nuts or the like are threaded onto the ends of the rod 130.

Likewise, tube spacers 134 are positioned along the second passageway 42 between the rack member 16a and the rack member 16b, between the walls 98 and 100 of the sliding member 96a, between the rack member 16b and the rack member 16c, between the walls 98 and 100 of the sliding member 96c and between the rack member 16c and the rack member 16d. The spacers 134 are appropriately dimensioned in length so as to either fit between the walls 98 and 100 of the sliding members 96a and 96b or so as to space adjacent rack members 16 a predetermined distance. The second rod 132 is positioned in the second passageway 42 and is specifically positioned in the apertures 54 in the supports 46, in the apertures 36 in the legs 18 and 20 of the rack members 16, in the slots 106 of sliding members 96 and through the spacers 134. The second rod 132 includes a pair of threaded ends that terminate in the channels 34 of rack members 16a and 16d. Fasteners 138 such as washers and nuts are threaded onto the ends of the rod 132.

As best shown in FIGS. 2 and 6, with the first rod 130 and second rod 132 in the respective passageways 38 and 42, the slidable members 96a and 96b are able to slide within the respective channels 34 due to the elongate slots 106 and 108 in the walls 98 and 100 of the sliding members 96. FIG. 2 illustrates the adjustability of the sliding members 96 with attached backrest 114 illustrating one position (solid lines) and an adjusted position (phantom lines). The sliding members 96 therefore have a range of sliding motion equal to the length of the elliptical slots 106 and 108.

Referring back now to FIGS. 1 and 2, to secure the assembly 10 to a motorcycle 12, the assembly 10 is orientated such that backrest 114 extends upwardly from the luggage rack portion 14 and the second end edge 32 of the support surface 28 is closest to the motorcycle seat. The assembly 10 can then be secured to the motorcycle 12 through the use of fasteners 140 and the apertures 66 in the supports 46 and the boss 80 and apertures 82 in the license plate bracket 74.

Continuing to refer to FIG. 2, due to the fact that the backrest 114 is secured to the sliding members 96, the position of the backrest 114 relative to the luggage rack portion 14 can be adjusted by movement of the sliding members 96 in the channels 34 of the rack members 16b and 16c. When the sliding members 96 are slid within the channels 34, the L-shaped portions 120 of the backrest 114 are able to freely move as well due to the relieved portions 44 in rack members 16b and 16c. When a desired position of the backrest 114 is achieved, the backrest 114 and sliding members 96 are secured in that position by tightening the fasteners 138 on the ends of the rods 130 and 132. By tightening the fasteners 138, the spacers 134 apply forces to the walls 98 and 100 of the sliding members 96 and the legs 18 and 20 of the rack members 16 to prohibit the sliding members 96 from moving within their respective channels 34. Tightening of the fasteners 138 also secures the supports 46 to rack members 16a and 16d. If the backrest 114 needs to be readjusted, the fasteners 138 are loosened and the backrest 114 can be repositioned as desired by moving the sliding members 96.

The rack members 16, the supports 46, the bracket 74, the sliding members 96 and the spacers 134 are preferably fabricated out of a durable material such as steel. However, the components of the assembly 10 can be fabricated from a wide variety of materials.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

We claim:

1. A luggage rack and backrest assembly comprising:
   a luggage rack portion;
   an adjustment member slidably connected to said luggage rack portion; and
   a backrest detachably connected to said adjustment member.

2. A luggage rack and backrest assembly as claimed in claim 1, wherein said backrest is secured to said adjustment member via removable fasteners.

3. A luggage rack and backrest assembly as claimed in claim 2, wherein said removable fasteners comprise threaded bolts.

4. A luggage rack and backrest assembly as claimed in claim 1, further comprising a securing device for securing a position of said adjustment member relative to said luggage rack portion.

5. A luggage rack and backrest assembly as claimed in claim 4, wherein said securing device includes a transverse rod at least partially extending through said adjustment member.

6. A luggage rack and backrest assembly as claimed in claim 5, wherein said adjustment member includes at least one slot through which said transverse rod is positioned.

7. A luggage rack and backrest assembly as claimed in claim 5, wherein said transverse rod is at least partially threaded.

8. A method of using a luggage rack and backrest assembly having a luggage rack portion, an adjustment member connected to the luggage rack portion, and a backrest connected to the adjustment member, said method comprising the steps of:
   sliding the backrest and the adjustment member relative to the luggage rack portion;
   securing the adjustment member in place relative to the luggage rack portion; and
   detaching the backrest from the adjustment member.

9. A method as claimed in claim 8, further comprising, before said moving step, the step of loosening the connection between the adjustment member and the luggage rack portion.

10. A method as claimed in claim 8, wherein the backrest is connected to the adjustment member by fasteners, and wherein said detaching step includes the step of loosening the fasteners.

11. A motorcycle having a luggage rack and a backrest assembly mounted thereon, said assembly comprising:
    a luggage rack;
    an adjustment member movably connected to said luggage rack portion;
    a backrest detachably connected to said adjustment member; and
    a securing device for securing a position of said adjustment member relative to said luggage rack portion.

12. A motorcycle as claimed in claim 11, wherein said adjustment member is slidably connected to said luggage rack portion.

13. A motorcycle as claimed in claim 11, wherein said backrest is secured to said adjustment member via removable fasteners.

14. A motorcycle as claimed in claim 13, wherein said removable fasteners comprise threaded bolts.

15. A motorcycle as claimed in claim 11, wherein said securing device includes a transverse rod at least partially extending through said adjustment member.

16. A motorcycle as claimed in claim 15, wherein said adjustment member includes at least one slot through which said transverse rod is positioned.

17. A motorcycle as claimed in claim 15, wherein said transverse rod is at least partially threaded.

* * * * *